(12) United States Patent
Watanabe

(10) Patent No.: US 11,880,929 B2
(45) Date of Patent: Jan. 23, 2024

(54) IMAGE PROCESSING APPARATUS, COMPUTER READABLE MEDIUM, AND IMAGE PROCESSING METHOD

(71) Applicant: Mitsubishi Electric Corporation, Tokyo (JP)

(72) Inventor: Futa Watanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/843,441

(22) Filed: Jun. 17, 2022

(65) Prior Publication Data
US 2022/0319099 A1 Oct. 6, 2022

Related U.S. Application Data

(63) Continuation of application No. PCT/JP2020/005900, filed on Feb. 14, 2020.

(51) Int. Cl.
*G06T 15/08* (2011.01)
*G06F 3/04847* (2022.01)

(52) U.S. Cl.
CPC .......... *G06T 15/08* (2013.01); *G06F 3/04847* (2013.01); *G06T 2200/24* (2013.01); *G06T 2210/62* (2013.01)

(58) Field of Classification Search
CPC . G06T 15/08; G06T 2200/24; G06T 2210/62; G06F 3/04847
See application file for complete search history.

(56) References Cited

U.S. PATENT DOCUMENTS 6,219,059 B1 * 4/2001 Argiro .................. G16H 30/20
345/426
6,556,199 B1 * 4/2003 Fang ....................... G06T 15/08
345/424

(Continued)

FOREIGN PATENT DOCUMENTS

JP 2003-91735 A 3/2003
JP 2003-325514 A 11/2003

(Continued)

OTHER PUBLICATIONS

Australian Office Action for Application No. 2020428449 dated Oct. 19, 2022.

(Continued)

*Primary Examiner* — William A Beutel
(74) *Attorney, Agent, or Firm* — Birch, Stewart, Kolasch & Birch, LLP

(57) ABSTRACT

An image processing apparatus (1) includes a numerical value receiving unit (10), a transparency determination unit (20), a display color determination unit (30), and a voxel display unit (40). The numerical value receiving unit (10) receives a numerical value. The transparency determination unit (20) determines a transparency of each one of a plurality of voxels each associated with a position in a three-dimensional space and associated with a value of a state quantity of the three-dimensional space at that position, based on the received numerical value and the value of the state quantity. The display color determination unit (30) determines a display color of each voxel according to display color information which defines the display color of the voxel in accordance with the value of the state quantity. The voxel display unit (40) displays the voxel for which the transparency and the display color have been determined on a display device (220).

10 Claims, 15 Drawing Sheets

(56) References Cited

U.S. PATENT DOCUMENTS

| | | | |
|---|---|---|---|
| 8,948,485 B2 | 2/2015 | Tsujita | |
| 2007/0255138 A1* | 11/2007 | Kristofferson | A61B 8/483 600/443 |
| 2010/0020117 A1 | 1/2010 | Tanizoe et al. | |
| 2012/0087564 A1* | 4/2012 | Tsujita | A61B 8/5223 382/131 |
| 2012/0154400 A1* | 6/2012 | Steen | G06T 7/187 345/424 |
| 2015/0135143 A1* | 5/2015 | Dysvik | G01V 1/345 715/848 |
| 2015/0193961 A1 | 7/2015 | Nakagawa et al. | |
| 2015/0248750 A1* | 9/2015 | Tsujita | G06T 7/00 382/131 |
| 2015/0342569 A1* | 12/2015 | Zhai | A61B 8/5223 600/443 |
| 2016/0005218 A1 | 1/2016 | Day et al. | |
| 2016/0267705 A1* | 9/2016 | O'Leary | G06T 17/00 |
| 2016/0292912 A1* | 10/2016 | Sebok | G06T 15/503 |
| 2017/0263023 A1* | 9/2017 | Zhou | G06T 11/008 |

FOREIGN PATENT DOCUMENTS

| | | |
|---|---|---|
| JP | 2008-104695 A | 5/2008 |
| JP | 2006-201838 A | 8/2008 |
| JP | 2010-88016 A | 4/2010 |
| JP | 2012-63055 A | 3/2012 |
| JP | 2015-128545 A | 7/2015 |
| WO | WO 2010/143587 A1 | 12/2010 |

OTHER PUBLICATIONS

International Search Report (PCT/ISA/210) issued in PCT/JP2020/005900, dated Mar. 24, 2020.

Written Opinion of the International Searching Authority (PCT/ISA/237) issued in PCT/JP2020/005900, dated Mar. 24, 2020.

* cited by examiner

US 11,880,929 B2

IMAGE PROCESSING APPARATUS, COMPUTER READABLE MEDIUM, AND IMAGE PROCESSING METHOD

CROSS REFERENCE TO RELATED APPLICATIONS

This application is a Continuation of PCT International Application PCT/JP2020/005900, filed on Feb. 14, 2020, which is hereby expressly incorporated by reference into the present application.

TECHNICAL FIELD

The present disclosure relates to an image processing apparatus for processing voxels.

BACKGROUND ART

In conventional arts, there has been disclosed an image processing apparatus that makes a user specify a voxel the user is interested in and displays voxels such that a voxel farther relative to the specified voxel has a lower transparency for improved visibility of an image (for example, Literature 1). On this conventional image processing apparatus, the user specifies one or more voxels in which he/she is interested. Then, based on a distance between the specified voxel and other voxels, the transparencies of voxels around the specified voxel are set. In the image processing apparatus of Patent Literature 1, information possessed by voxels is limited to positional information and brightness information representing black/white, so that the technique of Patent Literature 1 cannot be applied when the user is interested in numerical data possessed by voxels. Accordingly, in cases where information like sensor data is associated with voxels, the conventional technique cannot improve the visibility of voxels associated with the sensor data in which the user is interested.

CITATION LIST

Patent Literature

Patent Literature 1: JP 2003-91735

SUMMARY OF INVENTION

Technical Problem

An object of the present disclosure is to provide an apparatus that improves the visibility of voxels having numerical data like sensor data in a three-dimensional space.

Solution to Problem

An image processing apparatus according to the present invention includes:
 a numerical value receiving unit to receive a numerical value;
 a transparency determination unit to determine a transparency of each of a plurality of voxels each associated with positional information indicating a position in a three-dimensional space and associated with a value of a state quantity of the three-dimensional space at the position indicated by the positional information, based on the received numerical value and the value of the state quantity;
 a display color determination unit to determine a display color of each voxel according to display color information which defines the display color of voxel in accordance with the value of the state quantity; and
 a voxel display unit to display the voxel for which the transparency and the display color have been determined on a display device.

Advantageous Effects of Invention

According to the present disclosure, an apparatus that improves the visibility of voxels for numerical data like sensor data in a three-dimensional space can be provided.

DESCRIPTION OF EMBODIMENTS

Figure 1:
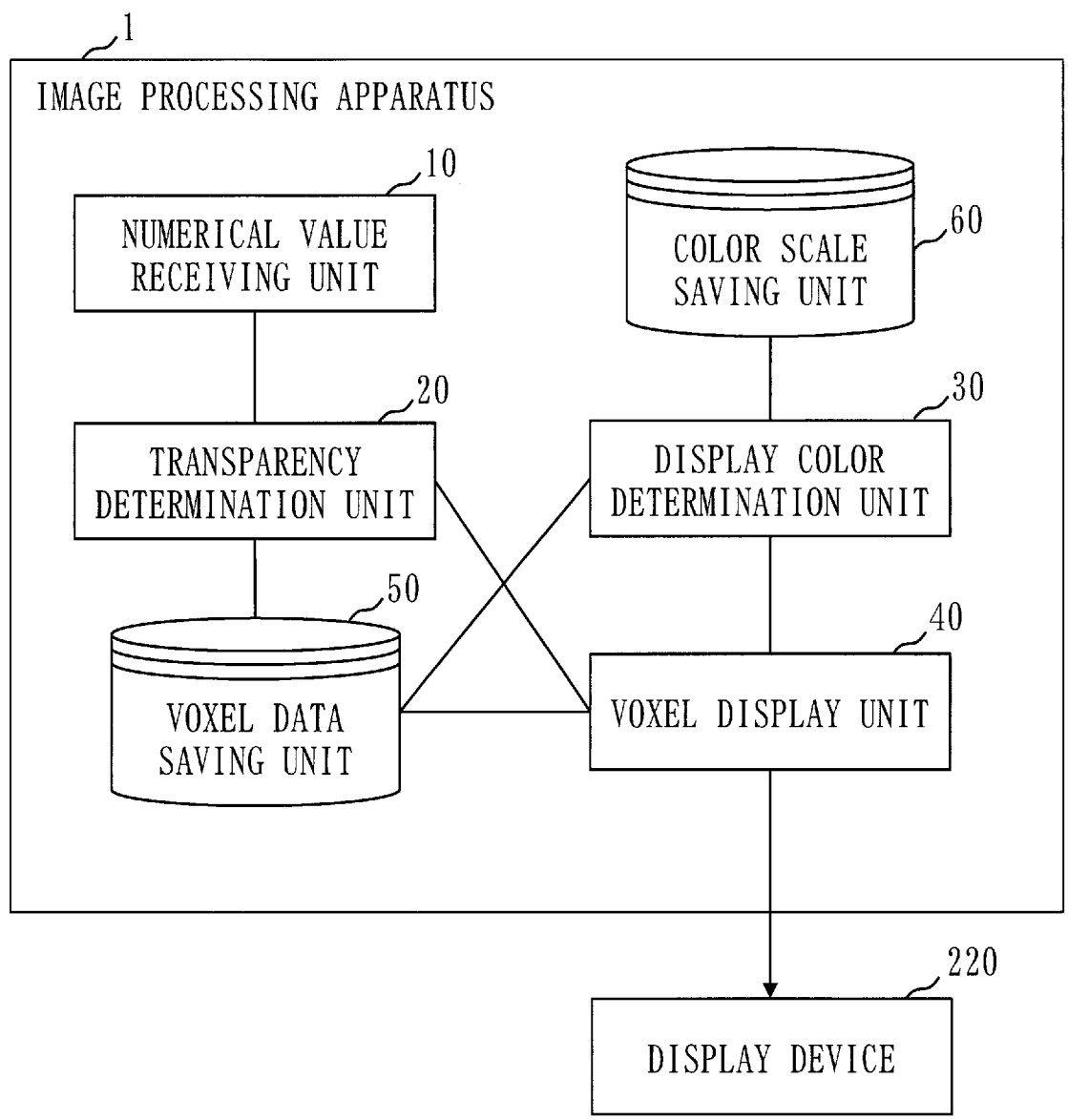
FIG. 1 is a diagram of Embodiment 1 showing a functional block diagram of an image processing apparatus 1.

Embodiments are described below with the drawings. In the drawings, the same or equivalent portions are denoted with the same reference characters. In the description of the embodiments, description will be omitted or simplified as appropriate for the same or equivalent portions.

Embodiment 1

Figure 2:
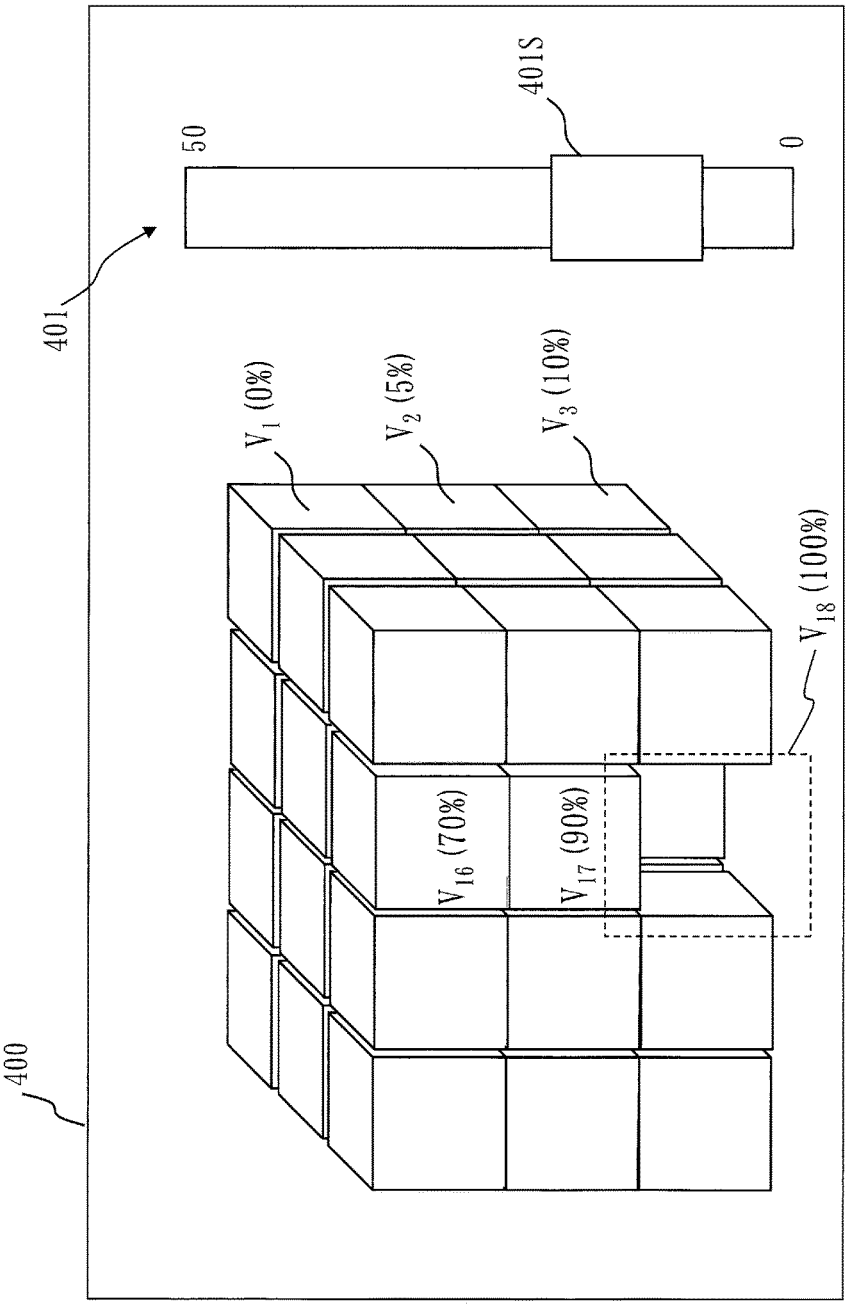
FIG. 2 is a diagram of Embodiment 1 showing a situation where non-transparent voxels are displayed in a space 301 in which multiple voxels are set.

Referring to FIGS. 1 to 4, an image processing apparatus 1 of Embodiment 1 is described.
FIG. 1 shows a functional block diagram of the image processing apparatus 1 of Embodiment 1.
FIG. 2 shows an image 400 displayed by a voxel display unit 40 of the image processing apparatus 1 on a screen of a display device 220. In FIG. 2, a numerical value specifying part 401 and multiple voxels are being displayed.

<Voxel>

A voxel is a regular grid unit that is set in a three-dimensional space. In the three-dimensional space, multiple voxels are set. In the embodiments below, voxels are denoted as voxels $V_1, V_2, V_3 \ldots$. Voxels $V_1, V_2, V_3 \ldots$ can be denoted as voxel $V_i$. Here, i is i=1, 2, 3 . . . . The voxel $V_i$ is associated with positional information indicating a position $P_i=(X_i, Y_i, Z_i)$ in the three-dimensional space and is associated with a value $d_i$ of a state quantity of the three-dimensional space at the position $P_i$ indicated by the positional information. Here, a state quantity is an amount that can be associated with coordinates indicative of a point in a space, such as temperature, humidity, illuminance, pressure, or flow rate. The voxel $V_i$ also has a transparency $T_i$ and a display color $C_i$, as discussed later.

The voxel $V_i$ discussed in the embodiments below is associated with the position $P_i$, the value $d_i$ of the state quantity at the position $P_i$, the transparency $T_i$, and the display color $C_i$. The voxel $V_i$ can be represented as expression 1 below:

$$\text{Voxel } V_i = V_i(P_i, d_i, T_i, C_i) \tag{1}$$

DESCRIPTION OF CONFIGURATION

Referring to FIG. 1, the functional configuration of the image processing apparatus 1 is described. The image processing apparatus 1 includes a numerical value receiving unit 10, a transparency determination unit 20, a display color determination unit 30, the voxel display unit 40, a voxel data saving unit 50, and a color scale saving unit 60.

(1) The numerical value receiving unit 10 receives a specification of a numerical value D of interest. Using an input device such as a mouse, the user specifies the numerical value D. The user may specify either one or multiple numerical values D of interest.

(2) The transparency determination unit 20 determines the transparency $T_i$ of each voxel $V_i$ based on the specified numerical value D and the value $d_i$ retrieved from the voxel data saving unit 50. The value $d_i$ to be retrieved may be latest data or data at a certain point of time. Specifically, for a voxel $V_i$ with a small absolute value of a difference between the numerical value D and the value $d_i$, the transparency $T_i$ is made low, while for the voxel $V_i$ with a large absolute value, the transparency $T_i$ is made high. Detailed operations of the transparency determination unit 20 will be described later.

(3) The display color determination unit 30 determines the display color $C_i$ for each voxel $V_i$ based on the value $d_i$ retrieved from the voxel data saving unit 50 and the display color information retrieved from the color scale saving unit 60. Detailed operations of the display color determination unit 30 will be described later.

(4) The voxel display unit 40 displays the voxel $V_i$ on the screen of the display device 220 based on the transparency $T_i$ determined by the transparency determination unit 20 and the display color $C_i$ determined by the display color determination unit 30.

(5) The voxel data saving unit 50 stores the position $P_i$ of the voxel $V_i$ and the value $d_i$ of the state quantity. The position $P_i$ and the value $d_i$ may be measured data or simulation data.

(6) The color scale saving unit 60 stores a color scale necessary for the display color determination unit 30 to determine the display color.

DESCRIPTION OF OPERATION

Figure 3:
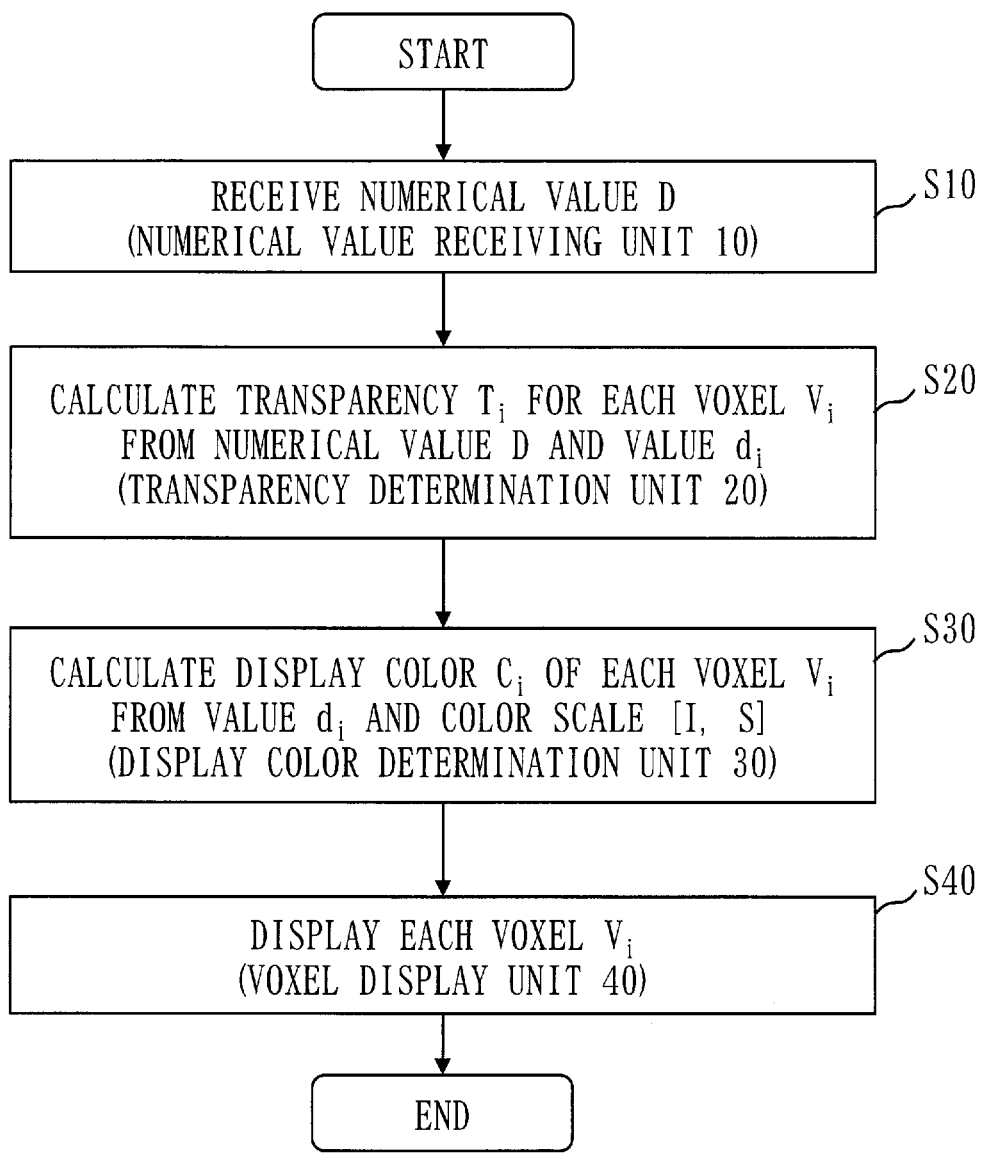
FIG. 3 is a diagram of Embodiment 1 and is a flowchart illustrating operations of the image processing apparatus 1.

FIG. 3 is a flowchart illustrating the operations of the image processing apparatus 1. Referring to FIG. 3, the operations of the image processing apparatus 1 are described. The parentheses in each step of FIG. 3 indicate the entity that performs the operation.

<Step S10>

At step S10, the numerical value receiving unit 10 receives the numerical value D. Specifically, the user moves a slider 401S of the numerical value specifying part 401 in FIG. 2 with a mouse and determines the numerical value D. With the numerical value specifying part 401 of FIG. 2, the numerical value D is a value equal to or greater than 0 to 50 or less. Once the numerical value D is determined with the slider 401S, the numerical value receiving unit 10 receives the numerical value D.

<Step S20>

At step S20, the transparency determination unit 20 determines the transparency $T_i$ of the voxel $V_i$ based on the received numerical value D and the value $d_i$ of the state quantity. The transparency $T_i$ of the voxel $V_i$ is determined by whether the received numerical value D and the value $d_i$ of the voxel $V_i$ are close to each other. Specifically, it is determined as follows. The numerical value receiving unit 10 calculates the transparency $T_i$ of the voxel $V_i$ according to expression 2 below using an absolute value of the difference between the value $d_i$ of the voxel $V_i$ and the received numerical value D. In expression 2, Z is an arbitrary coefficient. The transparency $T_i$ is indicated in %.

$$T_i = |D - d_i| \times Z \; (\%) \tag{2}$$

When the transparency $T_i$ is 0 (%), the voxel $V_i$ is opaque. That is, when $D=d_i$, the voxel $V_i$ is opaque. As the difference between D and $d_i$ is greater, the voxel $V_i$ is closer to transparent. When the transparency $T_i$ is 100 (%) or higher, the voxel $V_i$ is transparent.

<Step S30>

At step S30, the display color determination unit 30 determines the display color of each voxel $V_i$ according to display color information which defines the display color $C_i$ of the voxel $V_i$ in accordance with the value $d_i$ of the state quantity. The display color $C_i$ is determined by the value $d_i$ of the voxel $V_i$. $I_k$ closest to the value $d_i$ is determined and once $I_k$ is determined, color $S_k$ is determined. Specifically, it is determined as follows. The color scale saving unit 60 stores a color scale [I, S] shown below. The color scale [I, S] is display color information. The color scale [I, S] can be represented by expression 3.

$$\text{Color scale } [I, S] = [\{I_1, I_2, \ldots I_N\}, \{S_1, S_2 \ldots S_N\}] \tag{3}$$

1, 2, . . . N is the number of divisions of color. Here, k=1, 2, 3 . . . holds. The display color determination unit 30 determines the display color $C_i$ of the voxel $V_i$ in the following manner. The display color determination unit 30 calculates the display color $C_i$ according to expression 6 below using the value $d_i$ and the color scale [I, S].

Here, $$f: I_k \rightarrow S_k \tag{4}$$

is defined.

Also, $$I_1 < I_2 < \ldots < I_N \tag{5}$$

$$C_i = f(\arg\min|d_i - x|): x \in I_k \tag{6}$$

The display color $C_i$ of the voxel $V_i$ is determined according to expression 6 as follows.

(1) The display color determination unit 30 selects $I_k$ closest to the value $d_i$ from $I_1$ to $I_N$. $I_k$ is set as in expression 5. Thus, $I_k$ is determined from the value $d_i$.
(2) Since $I_k$ and $S_k$ are associated as in expressions 3 and 4, $S_k$ is determined from $I_k$.
(3) Thus, $I_k$ is determined from the value $d_i$ and $S_k$ is determined from $I_k$. For the color scale, in the case of temperature, for example, $S_1$ is a color close to blue and $S_N$ is set to a color close to red. While representation schemes such as RGB and CMYK can be used for color, any representation scheme may be used.

<Step S40>

At step S40, the voxel display unit 40 displays an image of the voxel $V_i$ on the screen of the display device 220 based on the transparency $T_i$ determined by the transparency determination unit 20 and the display color $C_i$ determined by the display color determination unit 30.

FIG. 2 is an image of the voxel $V_i$ displayed by the voxel display unit 40. The %-indication at $V_1$ (0%) in FIG. 2 indicates the transparency. In FIG. 2, voxels with a transparency of less than 100% are being displayed. In FIG. 2, voxel $V_{18}$ is not displayed because its transparency is 100%.

Figure 4:
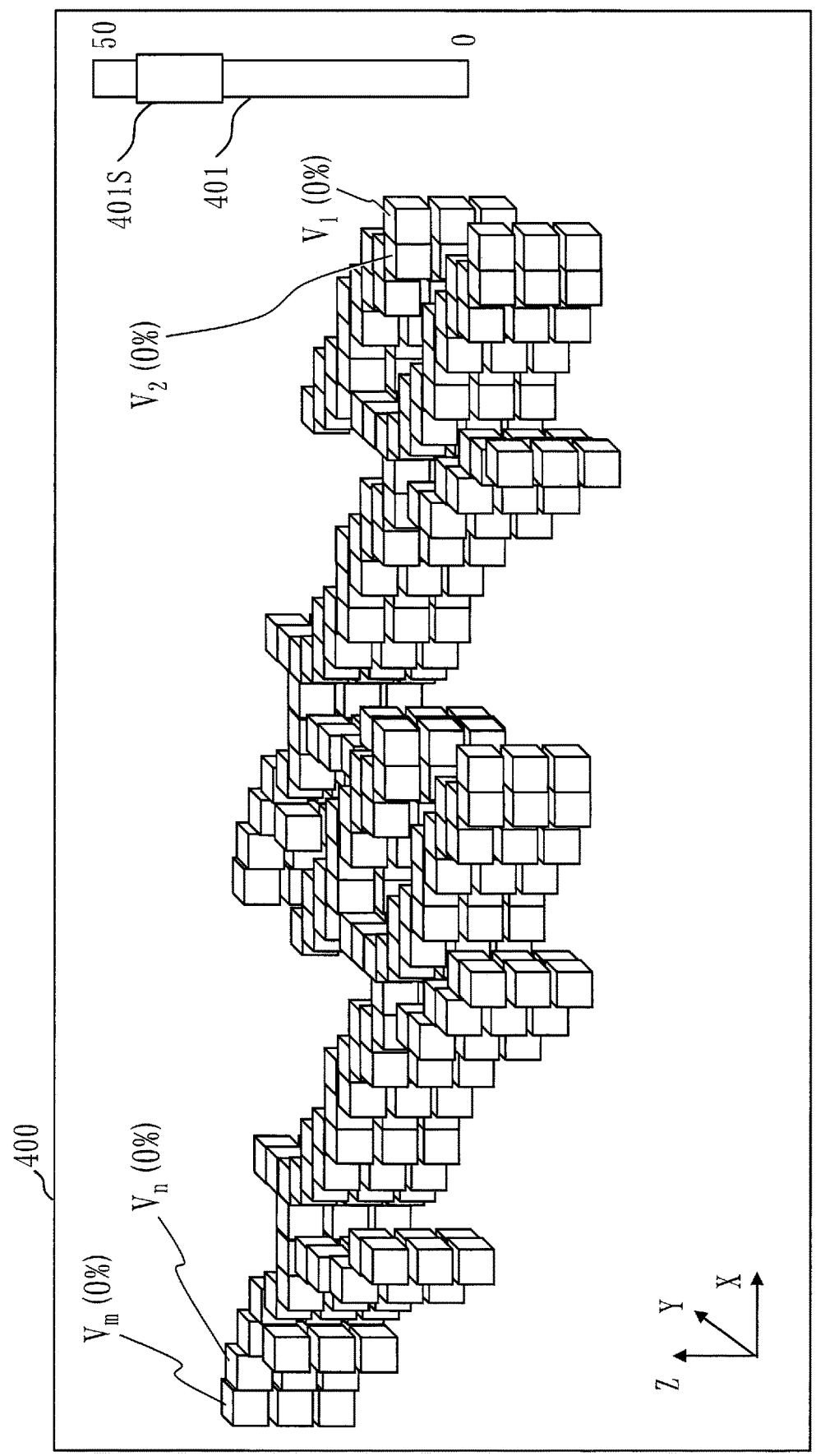
FIG. 4 is a diagram of Embodiment 1 conceptually showing an image 400 displayed by a voxel display unit 40.

FIG. 4 conceptually shows an image 400 displayed by the voxel display unit 40. In FIG. 4, each individual cube indicates a voxel. The voxels appearing in the image 400 of FIG. 4 have a transparency of less than 100%. The image processing apparatus 1 receives a numerical value D of the user's interest, rather than receiving a specification of a voxel of interest. Thus, as shown in FIG. 4, "$V_1$, $V_2$" and "$V_m$, $V_n$" are opaque because they all have a transparency of 0% although they are at a distance from each other. In this way, the image processing apparatus 1 determines the transparency of a voxel by focusing attention to the value $d_i$ possessed by the voxel rather than focusing attention to a voxel, so that a distribution of the numerical value D of interest can be known in a three-dimensional space.

Effect of Embodiment 1

With the image processing apparatus 1 of Embodiment 1, a numerical value D of interest is specified instead of a voxel of interest being specified, and the transparency determination unit 20 of the image processing apparatus 1 determines the transparency $T_i$ of the voxel $V_i$ from the difference between the value $d_i$ possessed by the voxel $V_i$ and the specified numerical value D. This can improve the visibility of voxels having numerical data like sensor data in a three-dimensional space. For example, when voxels having temperature sensor data are to be displayed, one can easily understand where regions of high temperature or regions of low temperature are present. This is a benefit arising from setting not only the display color $C_i$ but determining the transparency $T_i$ of each voxel $V_i$ based on the difference between the value $d_i$ possessed by the voxel $V_i$ and the numerical value D of interest.

In the case of two-dimensional display, only information on a specific aspect can be extracted. Thus, in order to understand the distribution of numerical data, it is necessary to repeatedly change the aspect of interest. By contrast, in the case of three-dimensional display, the distribution of numerical data can be understood via a single or a small number of operations since information for the entire space can be extracted. In addition, since the transparency $T_i$ is set for each voxel, voxels lying on a further side can be seen through by changing a direction of viewing in the case of three-dimensional display, which facilitates understanding of the distribution of the numerical value D of interest.

Embodiment 2

The image processing apparatus 1 of Embodiment 2 is described. As the functional block diagram of the image processing apparatus 1 in Embodiment 2 is the same as FIG. 1, it is omitted.

In Embodiment 2, the voxel $V_i$ is associated with a plurality of values $d_i$ of a time series as the value $d_i$ of a state quantity, Given that the state quantity is temperature, the voxel $V_i$ is associated with multiple values $d_{i,j}$ of a time series like [time 1, value $d_{i,1}$], [time 2, value $d_{i,2}$], ... [time N, value $d_{i,N}$]. Here, j=1, 2, 3 ... N holds. The value $d_{i,j}$ is the value $d_i$ at time j. Time j is a date and time like 13:57 on Feb. 1, 2020.

<Numerical Value Receiving Unit 10>

The numerical value receiving unit 10 receives, as the numerical value D, a state quantity change value indicating a change state of the state quantity of the three-dimensional space in a period indicated by the time series. A period indicated by the time series is a period from time 1 to time N in the above example. A state quantity change value is a value such as a difference Δ between a maximum and a minimum of the value $d_i$ in the period indicated by the time series, the maximum of the value $d_i$ in the period indicated by the time series, the minimum of the value $d_i$ in the period indicated by the time series, or a mean of the value $d_i$ in the period indicated by the time series.

<Transparency Determination Unit 20>

The transparency determination unit 20 determines the transparency $T_i$ of the voxel $V_i$ based on the received state quantity change value and the plurality of values $d_i$, j of the time series. In Embodiment 2, the transparency determination unit 20 uses the state quantity change value received by the numerical value receiving unit 10 as the numerical value D of expression 2. For the value $d_i$ of expression 2, the transparency determination unit 20 determines the value corresponding to the state quantity change value received by the numerical value receiving unit 10 from the multiple values $d_{i,j}$(j=1, 2, ... N) for the voxel $V_i$. If the state quantity change value received by the numerical value receiving unit 10 is the difference Δ between the maximum and the minimum of the value $d_i$ in the period indicated by the time series, the transparency determination unit 20 uses the difference Δ between the maximum and the minimum of the value $d_i$ in the period from time 1 to time N as the value $d_i$ of expression 2. If the state quantity change value received by the numerical value receiving unit 10 is the maximum of the value $d_i$ in the period indicated by the time series, the transparency determination unit 20 uses the maximum of the value $d_i$ in the period from time 1 to time N as the value $d_i$ of expression 2. Cases where the state quantity change value received by the numerical value receiving unit 10 is the minimum or the mean are similar to the case of the difference Δ. Whether the state quantity change value specified by the user corresponds to the difference Δ, the maximum, the minimum, or the mean is predetermined.

<Display Color Determination Unit 30>

The display color determination unit 30 determines the display color of each voxel $V_i$ according to display color information which defines the display color $C_i$ of the voxel $V_i$ in accordance with the plurality of values $d_{i,j}$ of the time series, as display color information. In Embodiment 2, the display color determination unit 30 uses, for the value $d_i$ of expression 6, the value $d_i$ which is determined by the transparency determination unit 20 from the multiple values $d_{i,j}$ (j=1, 2, ... N) as the value $d_i$ for use in expression 2.

<Voxel Display Unit 40>

The voxel display unit 40 displays an image of the voxel $V_i$ on the screen of the display device 220 based on the transparency $T_i$ determined by the transparency determination unit 20 and the display color $C_i$ determined by the display color determination unit 30.

Effect of Embodiment 2

In the image processing apparatus 1 of Embodiment 2, the transparency determination unit 20 determines the transparency $T_i$ from the numerical value D, which is a state quantity change value, received by the numerical value receiving unit 10 and the value $d_i$ determined from multiple values $d_j$, which change with time. Thus, it is possible to improve the visibility of voxels having a state quantity change value of interest among voxels having a state quantity changing with time.

Embodiment 3

Figure 5:
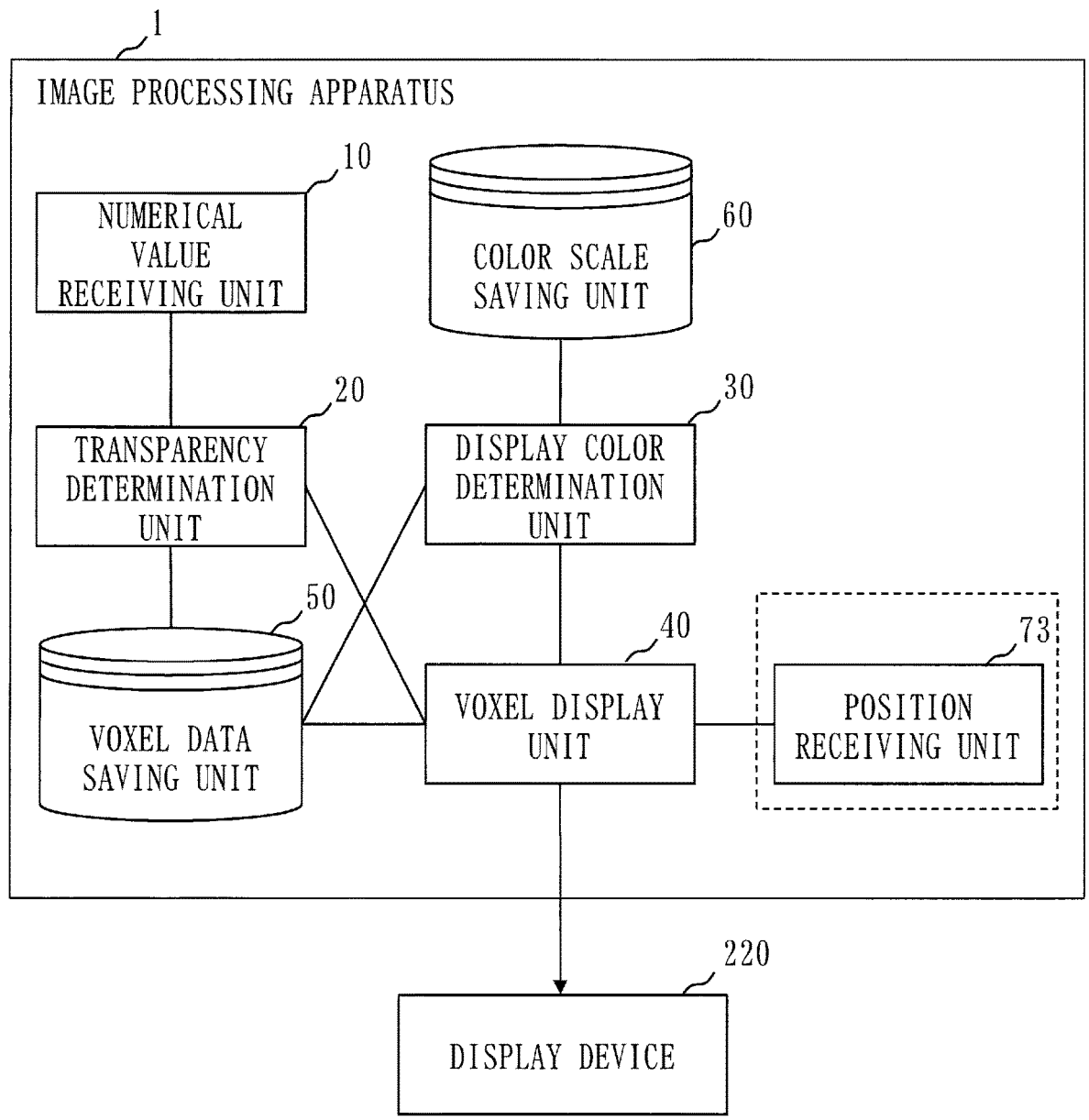
FIG. 5 is a diagram of Embodiment 3 and is a functional block diagram of the image processing apparatus 1.
Figure 6:
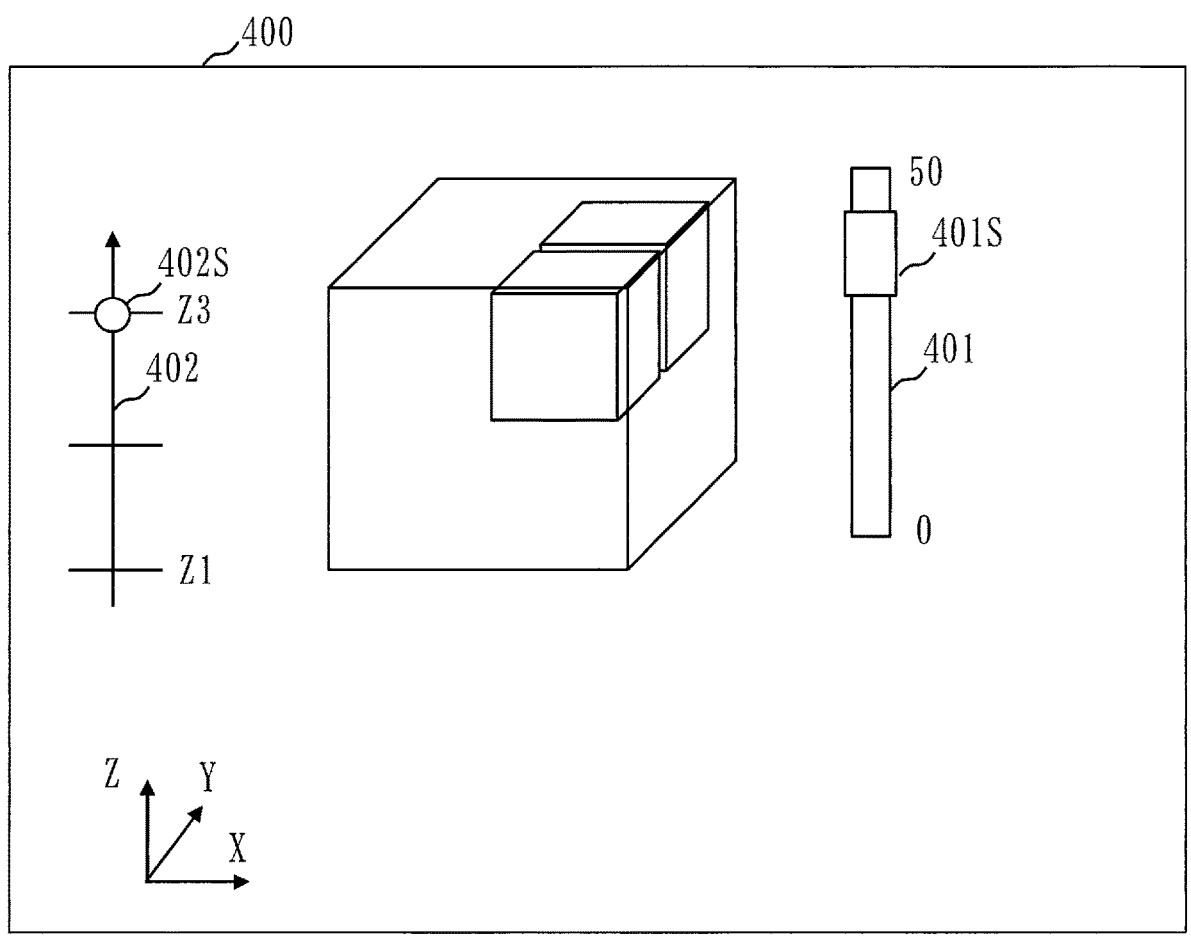
FIG. 6 is a diagram of Embodiment 3 showing an image 400 displayed on a screen of a display device 220.

With FIGS. 5 and 6, the image processing apparatus 1 of Embodiment 3 is described.

FIG. 5 is a functional block diagram of the image processing apparatus 1 of Embodiment 3.

FIG. 6 shows an image 400 displayed on the screen of the display device 220. In FIG. 6, a position specifying part 402 is displayed in addition to the numerical value specifying part 401. The position specifying part 402 has a slider 402S. The image processing apparatus 1 of FIG. 5 is of a configuration that additionally includes a position receiving unit 73 relative to the image processing apparatus 1 of FIG. 1.

The position receiving unit 73 receives a position in the three-dimensional space. As shown in FIG. 6, in the image 400, the position specifying part 402 is displayed in addition to the numerical value specifying part 401. The user specifies a position of interest by moving the slider 402S of the position specifying part 402 using an input device such as a mouse. In the example of FIG. 6, a position in Z-axis direction is specified with the slider 402S of the position specifying part 402. The position receiving unit 73 receives the position of interest specified with the slider 402S of the position specifying part 402.

The voxel display unit 40 displays the voxel at the Z-coordinate of the position received by the position receiving unit 73 on the display device 220. The position specifying part 402 has a function of allowing addition of a further position with respect to the specified position and also has a function of canceling the specified position. The position receiving unit 73 receives positions in accordance with addition and cancelation via the position specifying part 402. The voxel display unit 40 displays voxels on the display device 220 according to the position received by the position receiving unit 73. That is, in Embodiment 3, the voxel display unit 40 does not display voxels that are not relevant to the position received by the position receiving unit 73 even if they are voxels with a transparency of less than 100%. A voxel V with a transparency of 100% or higher is not displayed regardless of the position received by the position receiving unit 73.

Effect of Embodiment 3

Since the image processing apparatus 1 of Embodiment 3 includes the position receiving unit 73, it can clearly indicate in which range at the received position the numerical value D of interest is distributed.

In the above example, a position to be received by the position receiving unit 73 is specified with the slider 402S. However, a position to be received by the position receiving unit 73 may be specified with a mouse or in any manner. A position may also be specified as a three-dimensional region.

Embodiment 4

Figure 7:
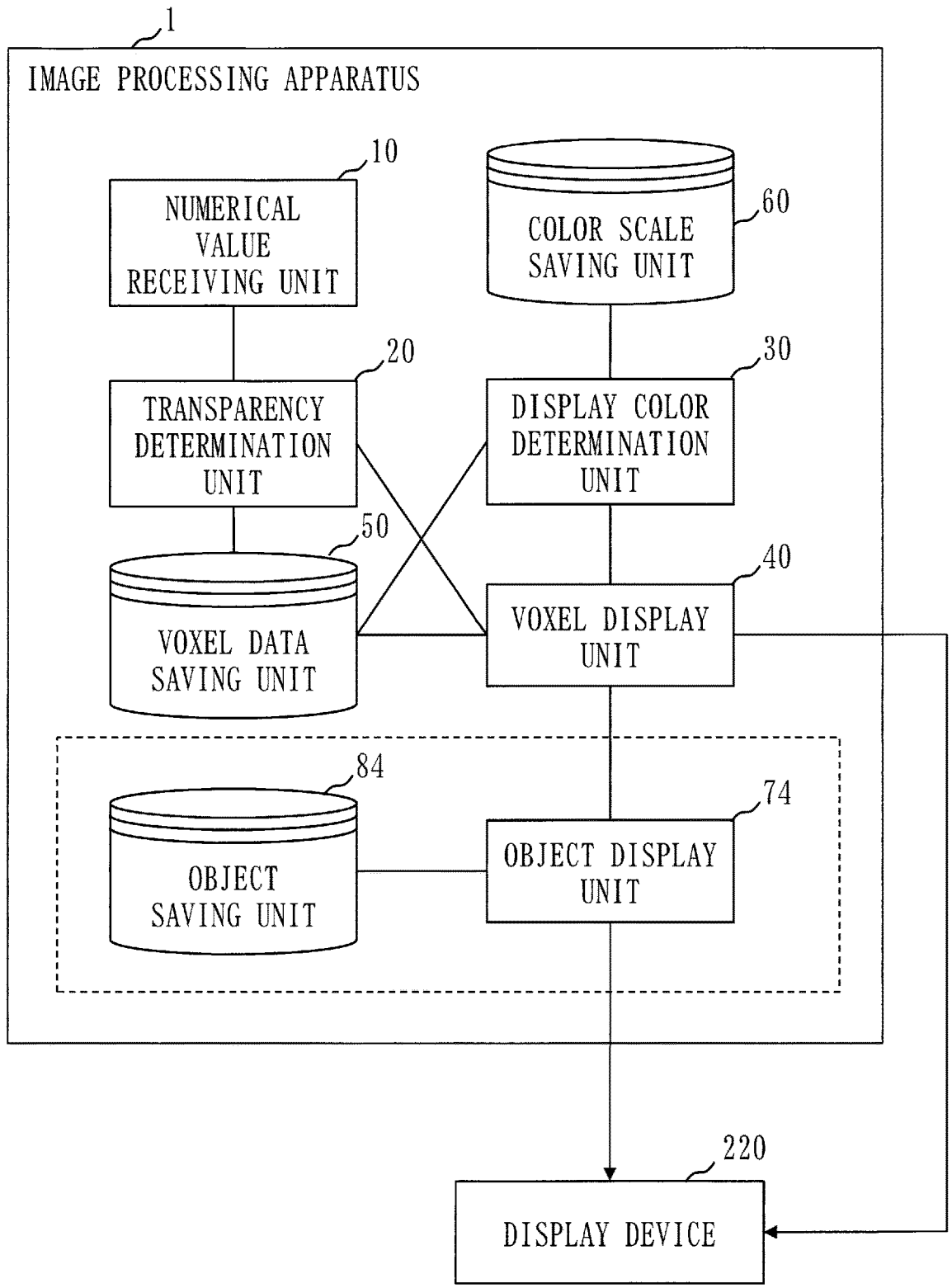
FIG. 7 is a diagram of Embodiment 4 and is a functional block diagram of the image processing apparatus 1.
Figure 8:
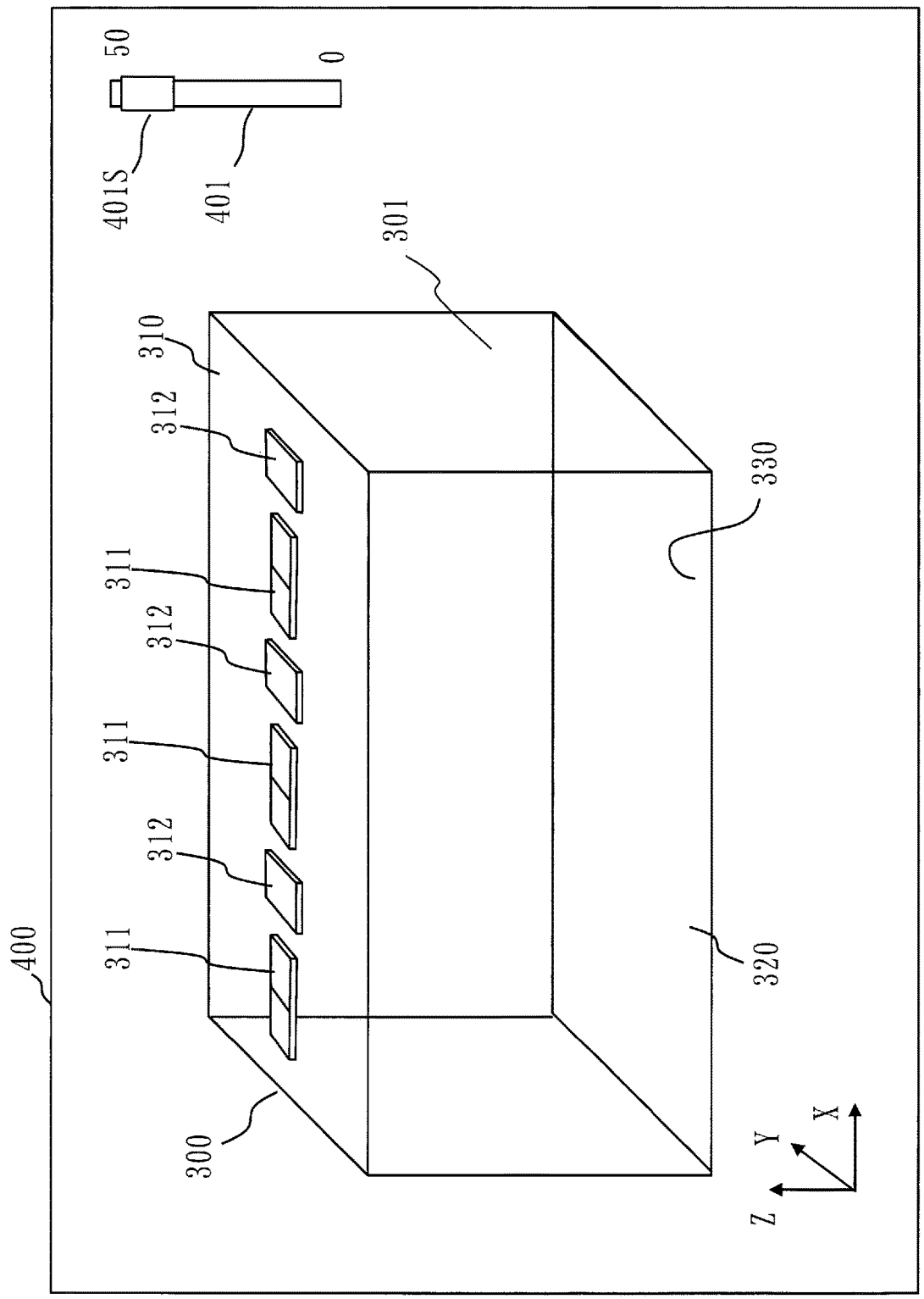
FIG. 8 is a diagram of Embodiment 4 showing an image 400 displayed on the screen of the display device 220.

Referring to FIGS. 7 and 8, Embodiment 4 is described.

FIG. 7 is a functional block diagram of the image processing apparatus 1 of Embodiment 4.

FIG. 8 shows an image 400 of objects displayed on the screen of the display device 220.

Figure 9:
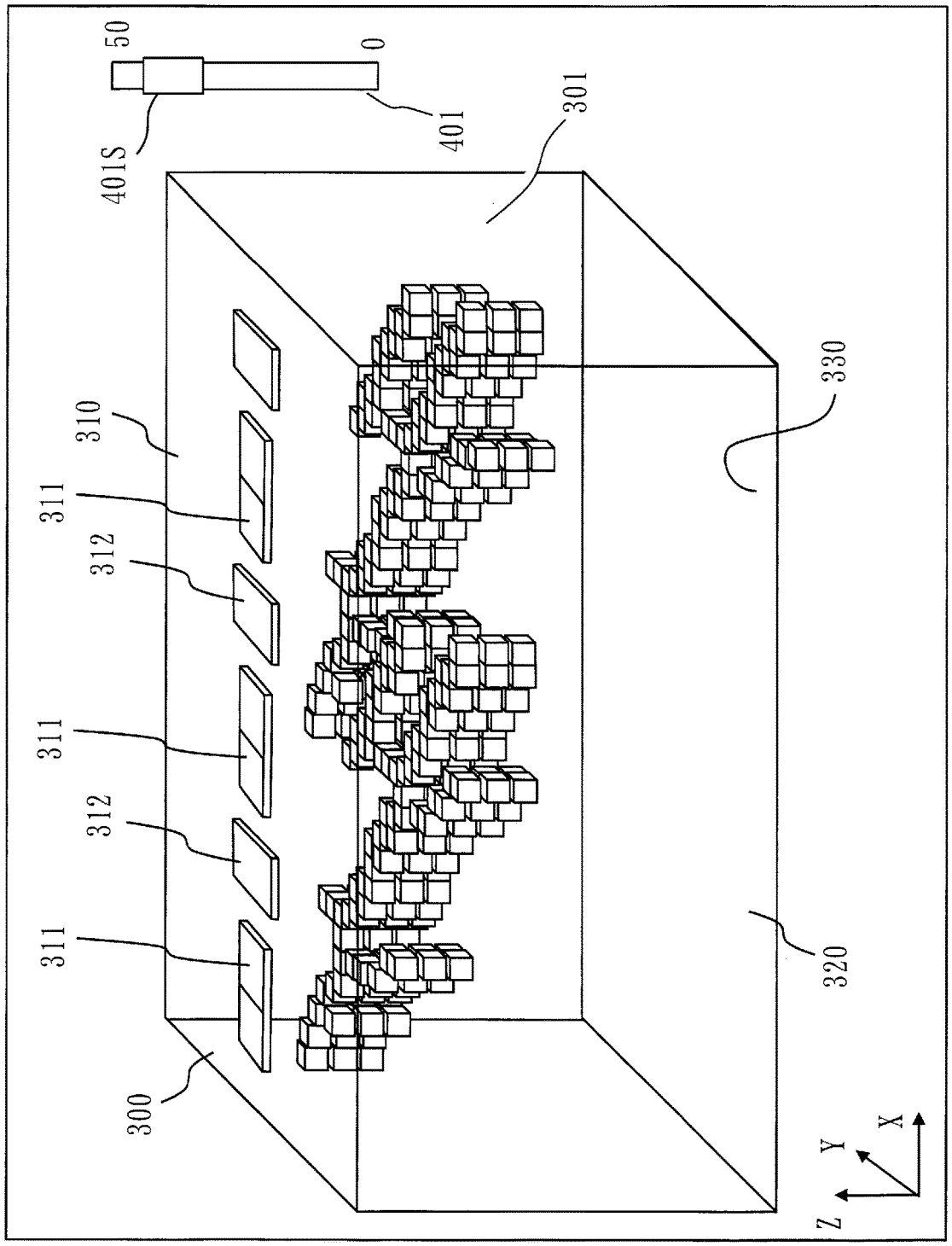
FIG. 9 is a diagram of Embodiment 4 showing a situation where the image 400 of FIG. 4 is displayed in the image 400 of FIG. 8.

FIG. 9 shows a situation where the image 400 of FIG. 4 is displayed in the image 400 of FIG. 8. The image processing apparatus 1 of FIG. 7 additionally includes an object display unit 74 and an object saving unit 84 relative to the image processing apparatus 1 of FIG. 1.

<Object Saving Unit 84>

The object saving unit 84 stores object data indicating data for objects that are arranged in the three-dimensional space. An object is an article arranged in a three-dimensional space, such as a wall, a floor, a window, an installation, and furniture. Object data includes position data, shape data, and graphic data of an object.

<Object Display Unit 74>

The object display unit 74 acquires data for objects retrieved from the object saving unit 84. The object display unit 74 uses the acquired data for the objects to display the objects over voxels on the display device 220. The object display unit 74 displays objects such as those in FIG. 8 on the screen of the display device 220. In FIG. 8, a room 300 and a space 301 are formed by a ceiling 310, four walls 320 forming side surfaces, and a floor 330 as objects. On the ceiling 310, three lights 311 and three air conditioners 312 are arranged as objects.

Effect of Embodiment 4

The image processing apparatus 1 of Embodiment 4 displays objects and voxels in a superimposed manner as in the image 400 of FIG. 9. Thus, the image processing apparatus 1 can clearly indicate around what kinds of objects the numerical value D of interest is distributed.

Embodiment 5

Figure 10:
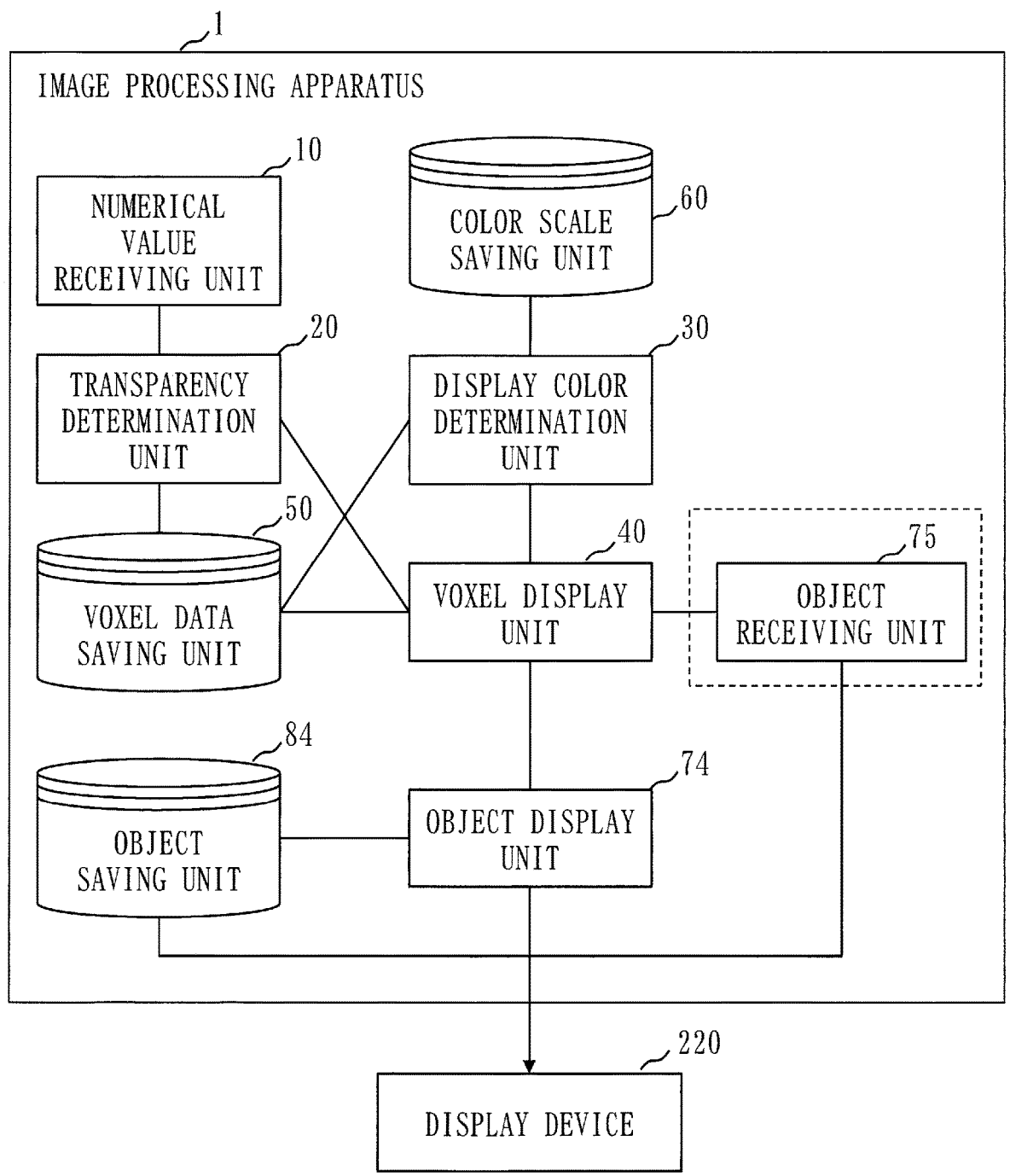
FIG. 10 is a diagram of Embodiment 5 and is a functional block diagram of the image processing apparatus 1.
Figure 11:
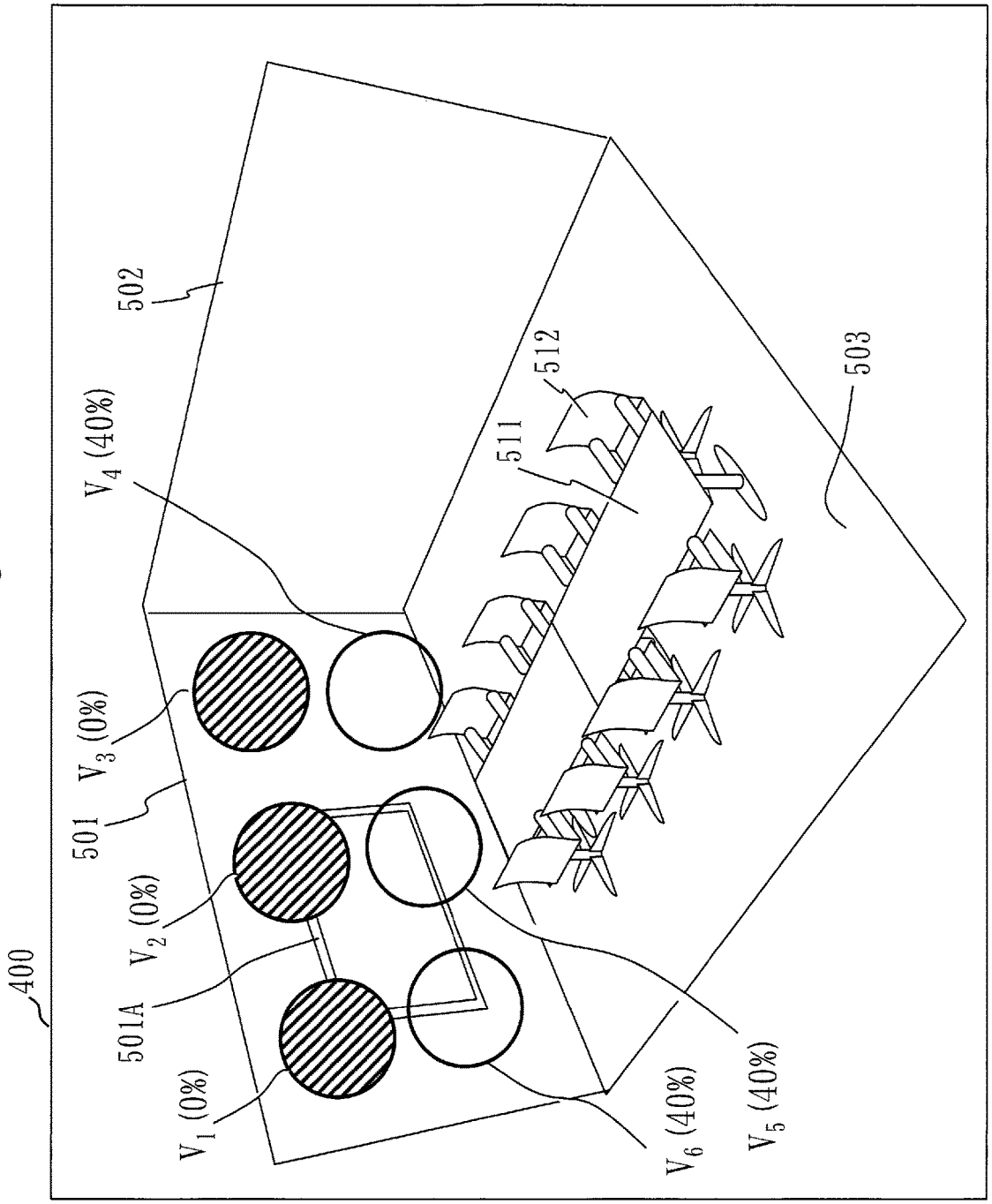
FIG. 11 is a diagram of Embodiment 5 showing an image 400 displayed on the screen of the display device 220.

Referring to FIGS. 10 and 11, the image processing apparatus 1 of Embodiment 5 is described.

FIG. 10 is a functional block diagram of the image processing apparatus 1 of Embodiment 5. The image processing apparatus 1 of FIG. 10 additionally includes an object receiving unit 75 relative to the image processing apparatus 1 of FIG. 7.

FIG. 11 shows an image 400 displayed on the screen of the display device 220. FIG. 11 shows a case where a wall on the west side 501 is selected as an object. In FIG. 11, the wall on the west side 501, a wall on the south side 502, a floor 503, two desks 511, and eight chairs 512 are being displayed as objects. As the wall on the west side 501 has been selected as an object, voxel $V_1$ (0%), $V_2$ (0%), $V_3$ (0%), $V_4$ (40%), $V_5$ (40%), and $V_6$ (40%) are being displayed in FIG. 11.

Figure 12:
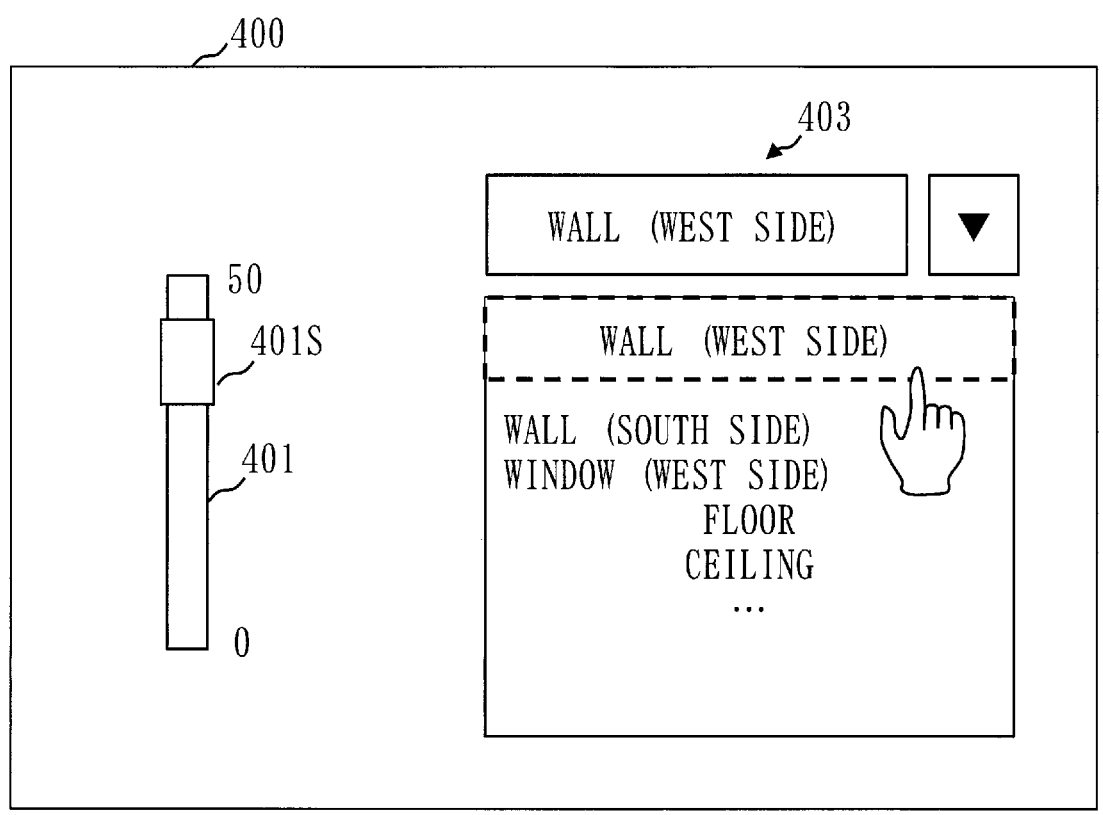
FIG. 12 is a diagram of Embodiment 5 showing an object specifying part 403.

FIG. 12 shows an image 400 of an object specifying part 403.

<Object Receiving Unit 75>

The object receiving unit 75 receives a specification of an object. As shown in FIG. 12, in the image 400, the object specifying part 403 is included in addition to the numerical value specifying part 401. An object to be specified is specified by the user using an input device such as a mouse. The image 400 of FIG. 12 is displayed within the image 400 of FIG. 11. When the user selects the wall on the west side 501, the floor 503, . . . in FIG. 12, the wall on the west side 501, the floor 503, . . . in the image of FIG. 11 become highlighted, allowing the user to know which objects the user is selecting.

<Voxel Display Unit 40>

The voxel display unit 40 displays voxels around the object received by the object receiving unit 75. Specifically, the voxel display unit 40 calculates the distance between the received object and the voxel $V_i$ and determines whether to display the voxel $V_i$ based on the calculated distance. The voxel display unit 40 displays the voxel $V_i$ if the calculated distance is equal to or less than a threshold. The voxel display unit 40 does not display the voxel $V_i$ even if the voxel $V_i$ has a transparency $T_i$ of less than 100% when the distance between the received object and the voxel exceeds the threshold. The voxel display unit 40 displays a voxel $V_i$ which has a transparency $T_i$ of less than 100% and the distance between which and the received object is equal to or less than the threshold. For the distance between the voxel $V_i$ and an object, the distance between their centers of gravity can be used.

Effect of Embodiment 5

The image processing apparatus 1 of Embodiment 5 can clearly indicate how the numerical value D of interest is distributed around an object of interest.

Embodiment 6

Figure 13:
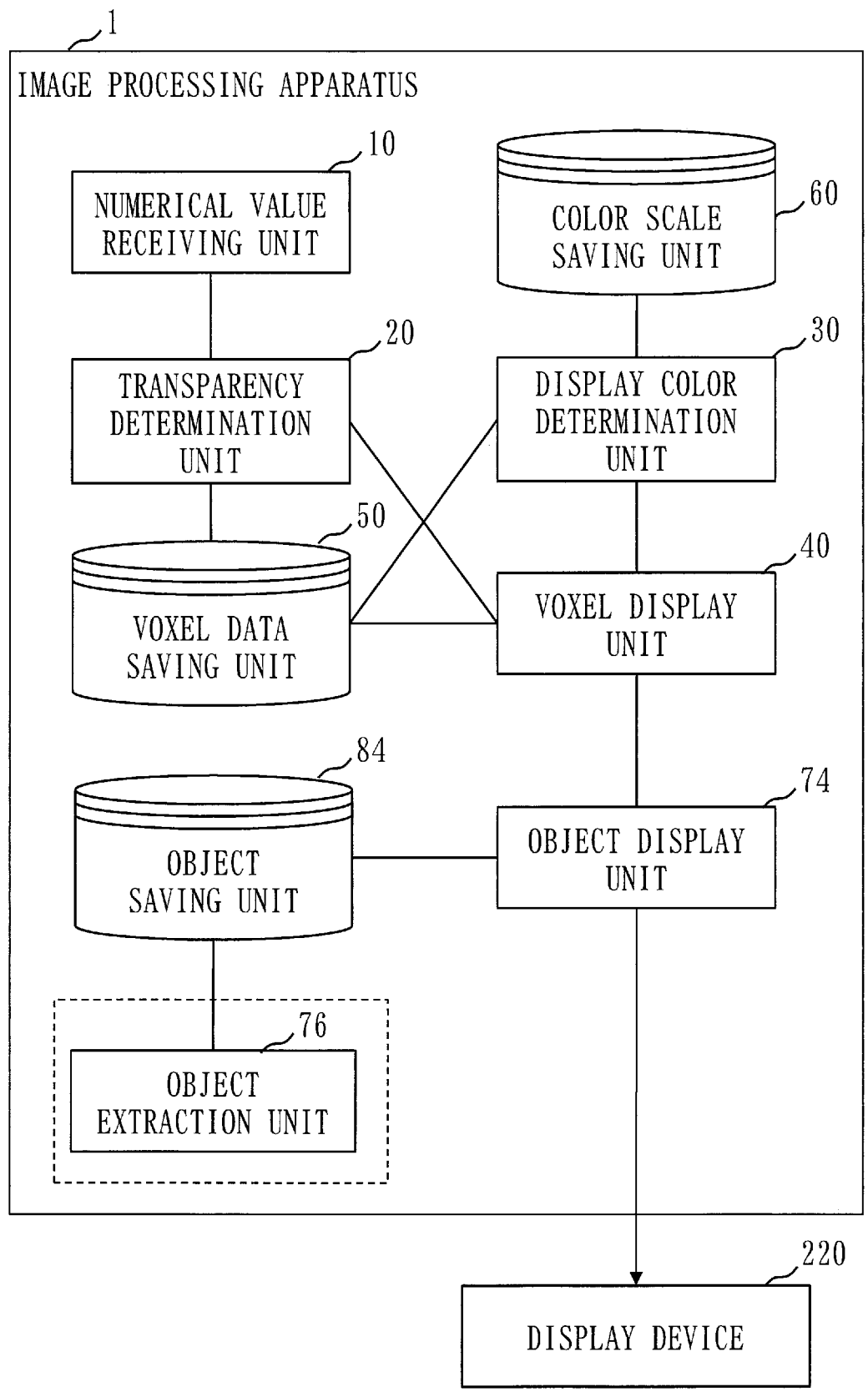
FIG. 13 is a diagram of Embodiment 6 and is a functional block diagram of the image processing apparatus 1.

Referring to FIG. 13, the image processing apparatus 1 of Embodiment 6 is described.

FIG. 13 is a functional block diagram of the image processing apparatus 1 of Embodiment 6. The image processing apparatus 1 of FIG. 13 additionally includes an object extraction unit 76 relative to the image processing apparatus 1 of Embodiment 4 in FIG. 7.

The object extraction unit 76 extracts object data from drawing data including object data. That is, the object extraction unit 76 has a function of extracting object data, which is stored in the object saving unit 84 of Embodiment 4, from drawing data. Drawing data may be digital drawings such as CAD and BIM (Building Information Modeling) or paper drawings. The object extraction unit 76 adopts an extraction method appropriate for the drawing from which object data is to be extracted. For a digital drawing, the object extraction unit 76 parses data of CAD and BIM and stores the position and shape information of objects contained in the data in the object saving unit 84.

Effect of Embodiment 6

Since the image processing apparatus 1 of Embodiment 6 extracts object information from drawing data, it can reduce operational burden in saving object information in the object saving unit 84.

Embodiment 7

<Hardware Configuration of Image Processing Apparatus 1>

Figure 14:
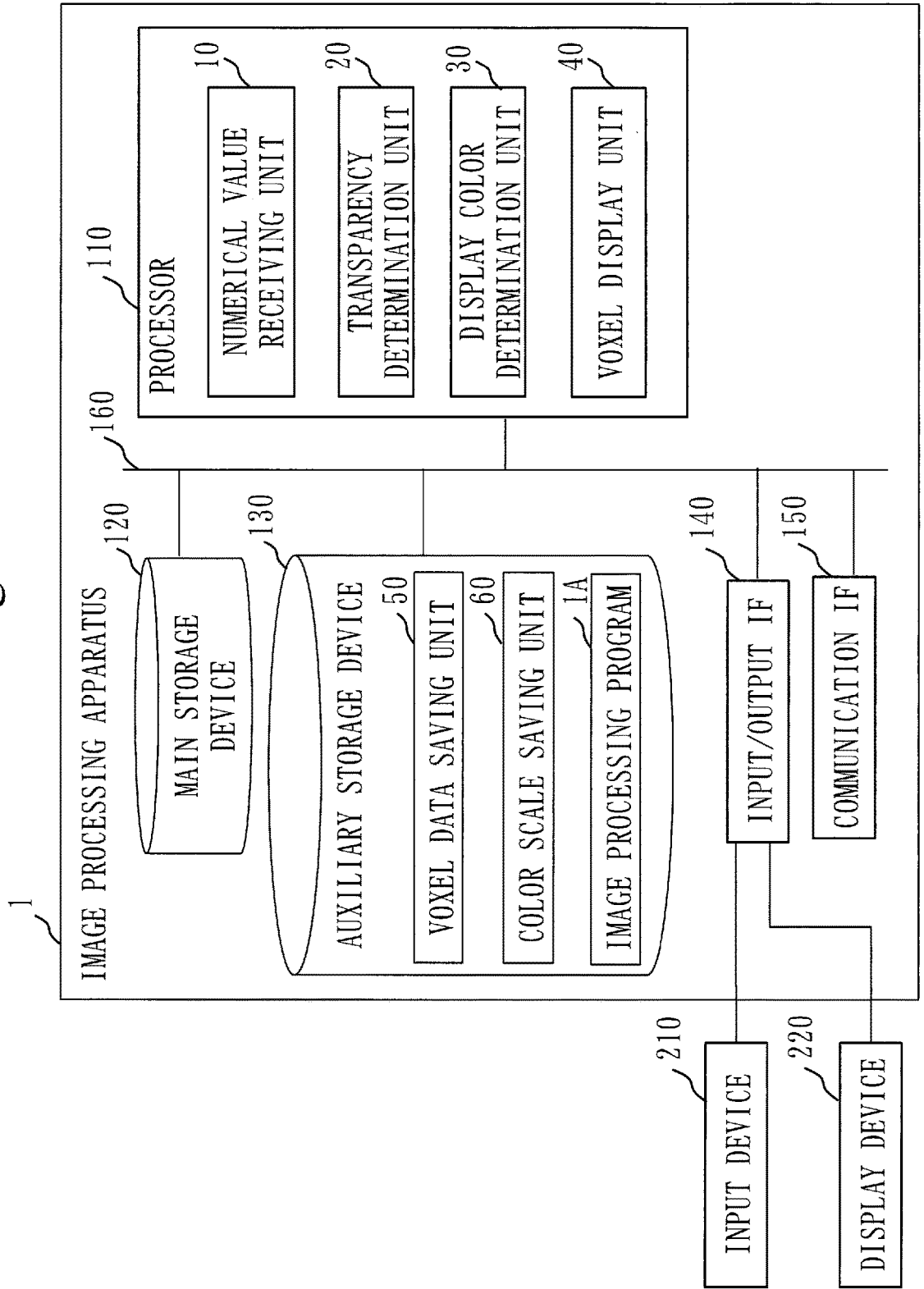
FIG. 14 is diagram of Embodiment 7 showing a hardware configuration of the image processing apparatus 1 of Embodiment 1.

FIG. 14 shows a hardware configuration of the image processing apparatus 1 of Embodiment 1. Referring to FIG. 14, the hardware configuration of the image processing apparatus 1 of Embodiment 1 is described.

The image processing apparatus 1 is a computer. The image processing apparatus 1 includes a processor 110. Besides the processor 110, the image processing apparatus 1 includes other pieces of hardware such as a main storage device 120, an auxiliary storage device 130, an input/output IF 140, and a communication IF 150. An interface is denoted as IF. The processor 110 is connected with the other pieces of hardware via a signal line 160 and controls the other pieces of hardware.

The image processing apparatus 1 includes the numerical value receiving unit 10, the transparency determination unit 20, the display color determination unit 30, and the voxel display unit 40 as functional elements. The functions of the numerical value receiving unit 10, the transparency determination unit 20, the display color determination unit 30, and the voxel display unit 40 are implemented by an image processing program 1A.

The processor 110 is a device to execute the image processing program 1A. The processor 110 is an IC (Integrated Circuit) that performs computational processing. Specific examples of the processor 110 are a CPU (Central Processing Unit), a DSP (Digital Signal Processor), and a GPU (Graphics Processing Unit).

Specific examples of the main storage device 120 are SRAM (Static Random Access Memory) and DRAM (Dynamic Random Access Memory). The main storage device 120 holds computation results from the processor 110.

The auxiliary storage device 130 is a storage device for storing data in a non-volatile manner. A specific example of the auxiliary storage device 130 is an HDD (Hard Disk Drive). The auxiliary storage device 130 may also be a removable recording medium such as an SD (registered trademark) (Secure Digital) memory card, NAND flash, flexible disk, optical disk, compact disk, Blu-ray (registered trademark) disk, and DVD (Digital Versatile Disk). The auxiliary storage device 130 stores the image processing program 1A.

The auxiliary storage device 130 also implements the voxel data saving unit 50 and the color scale saving unit 60.

The input/output IF 140 is a port to which data is input from devices and from which data is output to various apparatuses. The input/output IF 140 is connected to an input device 210 and the display device 220. The communication IF 150 is a communication port for the processor to communicate with other devices.

The processor 110 loads the image processing program 1A from the auxiliary storage device 130 into the main storage device 120 and reads the image processing program 1A from the main storage device 120 and executes it. The image processing apparatus 1 may include multiple processors to replace the processor 110. These multiple processors share the execution of the image processing program 1A. Each processor is a device to execute the image processing program 1A like the processor 110.

The image processing program 1A is a program that causes a computer to execute processes, procedures, or steps, where the "units" of the numerical value receiving unit 10, the transparency determination unit 20, the display color determination unit 30, and the voxel display unit 40 are read as "processes", "procedures", or "steps".

An image processing method is a method that is performed through the execution of image processing program 1A by the image processing apparatus 1, which is a computer. The image processing program 1A may be provided being stored in a computer-readable recording medium or may be provided as a program product.

The hardware configuration of the image processing apparatus 1 of Embodiment 2 is the same as FIG. 14.

The hardware configuration of the image processing apparatus 1 of Embodiment 3 is a configuration that additionally includes the position receiving unit 73 as a functional element relative to the processor 110 of FIG. 14. In this case, the image processing program 1A includes a program for implementing the function of the position receiving unit 73. The hardware configuration of the image processing apparatus 1 of Embodiment 3 is omitted.

The hardware configuration of the image processing apparatus 1 of Embodiment 4 is a configuration that additionally includes the object display unit 74 as a functional element relative to the processor 110 of FIG. 14. The auxiliary storage device 130 implements the object saving unit 84. The image processing program 1A includes a program for implementing the function of the object display unit 74. The hardware configuration of the image processing apparatus 1 of Embodiment 4 is omitted.

The hardware configuration of the image processing apparatus 1 of Embodiment 5 is a configuration that additionally includes the object display unit 74 and the object receiving unit 75 as functional elements relative to the processor 110 of FIG. 14. The auxiliary storage device 130 implements the object saving unit 84. The image processing program 1A includes a program for implementing the functions of the object display unit 74 and the object receiving unit 75. The hardware configuration of the image processing apparatus 1 of Embodiment 5 is omitted.

The hardware configuration of the image processing apparatus 1 of Embodiment 6 is a configuration that additionally includes the object display unit 74 and the object extraction unit 76 as functional elements relative to the processor 110 of FIG. 14. The image processing program 1A includes a program for implementing the functions of the object display unit 74 and the object extraction unit 76. The hardware configuration of the image processing apparatus 1 of Embodiment 6 is omitted.

<Supplementary Note on Hardware Configuration>

In the image processing apparatus 1 of FIG. 14, the functions of the image processing apparatus 1 are implemented by software, but the functions of the image processing apparatus 1 may be implemented by hardware.

Figure 15:
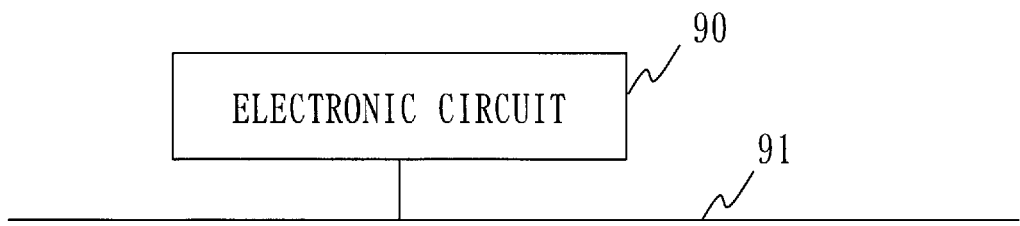
FIG. 15 is a diagram of Embodiment 7 showing a configuration in which functions of the image processing apparatus 1 of Embodiment 1 are implemented by hardware.

FIG. 15 is a configuration in which the functions of the image processing apparatus 1 are implemented by hardware. An electronic circuit 90 of FIG. 15 is a dedicated electronic circuit for implementing the functions of the numerical value receiving unit 10, the transparency determination unit 20, the display color determination unit 30, and the voxel display unit 40 of the image processing apparatus 1. The electronic circuit 90 is connected to a signal line 91. The electronic circuit 90 is specifically a single circuit, a composite circuit, a programmed processor, a parallel programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array. The functions of the components of image processing apparatus 1 may be implemented in one electronic circuit or implemented as being distributed across multiple electronic circuits. Also, some of the functions of the components of the image processing apparatus 1 may be implemented by an electronic circuit and the remaining functions may be implemented by software.

Each of the processor 110 and the electronic circuit 90 is also called processing circuitry. In the image processing apparatus 1, the functions of the numerical value receiving unit 10, the transparency determination unit 20, the display color determination unit 30, and the voxel display unit 40 may be implemented by processing circuitry.

The foregoing supplementary description on the hardware configuration is also applicable to the image processing apparatuses 1 of Embodiment 2 to Embodiment 5.

The image processing apparatuses 1 of Embodiment 1 to Embodiment 6 have been described above. Two or more of these embodiments may be practiced in combination. Alternatively, one of these embodiments may be partially practiced. Alternatively, two or more embodiments out of these embodiments may be partially practiced in combination.

REFERENCE SIGNS LIST

D: numerical value; $d_i$: value; $V_i$: voxel; $T_i$: transparency; 1: image processing apparatus; 1A: image processing program; 10: numerical value receiving unit; 20: transparency determination unit; 30: display color determination unit; 40: voxel display unit; 50: voxel data saving unit; 60: color scale saving unit; 73: position receiving unit; 74: object display unit; 75: object receiving unit; 76: object extraction unit; 84: object saving unit; 90: electronic circuit; 91: signal line; 110: processor; 120: main storage device; 130: auxiliary storage device; 140: input/output IF; 150: communication IF; 160: signal line; 210: input device; 220: display device; 300: room; 301: space; 310: ceiling; 311: light; 312: air conditioner; 320: wall; 330: floor; 400: image; 401: numerical value specifying part; 401S: slider; 402: position specifying part; 402S: slider; 403: object specifying part

The invention claimed is:

1. An image processing apparatus comprising processing circuitry to:
   receive a numerical value;
   determine a transparency of each of a plurality of voxels, each voxel in the plurality of voxels being associated with positional information indicating a position in a three-dimensional space and a value of a state quantity of the three-dimensional space at the position indicated by the positional information, as any value within a transparency range which is a range including a first value indicative of a voxel being opaque and a second value indicative of a voxel being transparent and is a range between the first value and the second value, based on a subtraction result corresponding to an absolute value of a difference between the received numerical value and the value of the state quantity associated with one of the plurality of voxels;
   determine a display color of each voxel in the plurality of voxels according to display color information which defines the display color in accordance with the value of the state quantity of each voxel in the plurality of voxels; and
   display each voxel in the plurality of voxels for which the transparency and the display color have been determined on a display device, wherein each of the plurality of voxels is associated with a plurality of values of a time series as the value of the state quantity, and the processing circuitry:
receives, as the numerical value, a state quantity change value indicating a change state of the state quantity of the three-dimensional space in a period indicated by the time series;
determines the transparency of each voxel in the plurality of voxels based on the received state quantity change value and the plurality of values of the time series; and
determines the display color of each voxel in the plurality of voxels according to display color information which defines the display color of one of the plurality of voxels iii accordance with the plurality of values of the time series, as the display color information.

2. The image processing apparatus according to claim 1, wherein the processing circuitry receives a position in the three-dimensional space, and displays each voxel in the plurality of voxels at the received position on the display device.

3. The image processing apparatus according to claim 1, wherein the processing circuitry, using object data indicating data for object that is arranged in the three-dimensional space, displays the object over at least one of the plurality of voxels on the display device.

4. The image processing apparatus according to claim 3, the processing circuitry receives a specification of a object, and displays at least one of the plurality of voxels around the received object.

5. The image processing apparatus according to claim 3, wherein the processing circuitry extracts object data from drawing data including the object data.

6. A non-transitory computer-readable recording medium storing an image processing program that causes a computer to execute:
a numerical value receiving process of receiving a numerical value;
a transparency determination process of determining a transparency of each of a plurality of voxels, each voxel in the plurality of voxels being associated with positional information indicating a position in a three-dimensional space and a value of a state quantity of the three-dimensional space at the position indicated by the positional information, as any value within a transparency range which is a range including a first value indicative of a voxel being opaque and a second value indicative of a voxel being transparent and is a range between the first value and the second value, based on a subtraction result corresponding to an absolute value of a difference between the received numerical value and the value of the state quantity associated with one of the plurality of voxels;
a display color determination process of determining a display color of each voxel in the plurality of voxels according to display color information which defines the display color in accordance with the value of the state quantity of each voxel in the plurality of voxels; and
a voxel display process of displaying each voxel in the plurality of voxels for which the transparency and the display color have been determined on a display device, wherein each of the plurality of voxels is associated with a plurality of values of a time series as the value of the state quantity,
the numerical value receiving process receives, as the numerical value, a state quantity change value indicating a change state of the state quantity of the three-dimensional space in a period indicated by the time series,
the transparency determination process determines the transparency of each voxel in the plurality of voxels based on the received state quantity change value and the plurality of values of the time series, and
the display color determination process determines the display color of each voxel in the plurality of voxels according to display color information which defines the display color of one of the plurality of voxels in accordance with the plurality of values of the time series, as the display color information.

7. An image processing method comprising:
receiving, a numerical value;
determining, a transparency of each of a plurality of voxels, each voxel the plurality of voxels being associated with positional information indicating a position in a three-dimensional space and a value of a state quantity of the three-dimensional space at the position indicated by the positional information, as any value within a transparency range which is a range including a first value indicative of a voxel being opaque and a second value indicative of a voxel being transparent and is a range between the first value and the second value, based on a subtraction result corresponding to an absolute value of a difference between the received numerical value and the value of the state quantity associated with one of the plurality of voxels;
determining, a display color of each voxel in the plurality of voxels according to display color information which defines the display color in accordance with the value of the state quantity of each voxel in the plurality of voxels; and
displaying, each voxel in the plurality of voxels for which the transparency and the display color have been determined on a display device, wherein each of the plurality of voxels is associated with a plurality of values of a time series as the value of the state quantity, and the method further comprises:
receiving, as the numerical value, a state quantity change value indicating a change state of the state quantity of the three-dimensional space in a period indicated by the time series;
determining the transparency of each voxel in the plurality of voxels based on the received state quantity change value and the plurality of values of the time series; and
determining the display color of each voxel in the plurality of voxels according to display color information which defines the display color of one of the plurality of voxels in accordance with the plurality of values of the time series, as the display color information.

8. An image processing apparatus comprising
processing circuitry to:
receive a numerical value;
determine a transparency of each of a plurality of voxels, each voxel in the plurality of voxels being associated with positional information indicating a position in a three-dimensional space and a value of a state quantity of the three-dimensional space at the position indicated by the positional information, in which as a subtraction result corresponding to an absolute value of a difference between the received numerical value and the value of the state quantity associated with one of the plurality of voxels is greater, the transparency of each voxel in the plurality of voxels is determined as a value closer to a value that is defined as a value making the one of the plurality of voxels transparent;

determine a display color of each voxel in the plurality of voxels according to display color information which defines the display color in accordance with the value of the state quantity of each voxel in the plurality of voxels; and display each voxel in the plurality of voxels for which the transparency and the display color have been determined on a display device, wherein each of the plurality of voxels is associated with a plurality of values of a time series as the value of the state quantity, and the processing circuitry:

receives, as the numerical value, a state quantity change value indicating a change state of the state quantity of the three-dimensional space in a period indicated by the time series;

determines the transparency of each voxel in the plurality of voxels based on the received state quantity change value and the plurality of values of the time series; and determines the display color of each voxel in the plurality of voxels according to display color information which defines the display color of one of the plurality of voxels in accordance with the plurality of values of the time series, as the display color information.

9. A non-transitory computer-readable recording medium storing an image processing program that causes a computer to execute:

a numerical value receiving process of receiving a numerical value;

a transparency determination process of determining a transparency of each of a plurality of voxels, each voxel in the plurality of voxels being associated with positional information indicating a position in a three-dimensional space and a value of a state quantity of the three-dimensional space at the position indicated by the positional information, in which as a subtraction result corresponding to an absolute value of a difference between the received numerical value and the value of the state quantity associated with one of the plurality of voxels is greater, the transparency of each voxel in the plurality of voxels is determined as a value closer to a value that is defined as a value making the one of the plurality of voxels transparent;

a display color determination process of determining a display color of each voxel in the plurality of voxels according to display color information which defines the display color in accordance with the value of the state quantity of each voxel in the plurality of voxels; and a voxel display process of displaying each voxel in the plurality of voxels for which the transparency and the display color have been determined on a display device, wherein each of the plurality of voxels is associated with a plurality of values of a time series as the value of the state quantity, the numerical value receiving process receives, as the numerical value, a state quantity change value indicating a change state of the state quantity of the three-dimensional space in a period indicated by the time series, the transparency determination process determines the transparency of each voxel in the plurality of voxels based on the received state quantity change value and the plurality of values of the time series, and the display color determination process determines the display color of each voxel in the plurality of voxels according to display color information which defines the display color of one of the plurality of voxels in accordance with the plurality of values of the time series, as the display color information.

10. An image processing method comprising:

receiving, a numerical value;

determining, a transparency of each of a plurality of voxels, each voxel in the plurality of voxels being associated with positional information indicating a position in a three-dimensional space and a value of a state quantity of the three-dimensional space at the position indicated by the positional information, in which as a subtraction result corresponding to an absolute value of a difference between the received numerical value and the value of the state quantity associated with one of the plurality of voxels is greater, the transparency of each voxel in the plurality of voxels is determined as a value closer to a value that is defined as a value making the one of the plurality of voxels transparent;

determining, a display color of each voxel in the plurality of voxels according to display color information which defines the display color in accordance with the value of the state quantity of each voxel in the plurality of voxels; and displaying, each voxel in the plurality of voxels for which the transparency and the display color have been determined on a display device, wherein each of the plurality of voxels is associated with a plurality of values of a time series as the value of the state quantity, and the method further comprises:

receiving, as the numerical value, a state quantity change value indicating a change state of the state quantity of the three-dimensional space in a period indicated by the time series;

determining the transparency of each voxel in the plurality of voxels based on the received state quantity change value and the plurality of values of the time series; and determining the display color of each voxel in the plurality of voxels according to display color information which defines the display color of one of the plurality of voxels in accordance with the plurality of values of the time series, as the display color information.

* * * * *